FDM DATA TRUNKING SYSTEM HAVING A COMMON TDM SUPERVISORY CHANNEL

Filed Dec. 28, 1962 5 Sheets-Sheet 1

INVENTORS J. O. EDSON
L. C. THOMAS
BY J. P. Kearns
ATTORNEY

FDM DATA TRUNKING SYSTEM HAVING A COMMON TDM SUPERVISORY CHANNEL

Filed Dec. 28, 1962 5 Sheets-Sheet 4

FDM DATA TRUNKING SYSTEM HAVING A COMMON TDM SUPERVISORY CHANNEL 3,261,922
Patented July 19, 1966

3,261,922

FDM DATA TRUNKING SYSTEM HAVING A COMMON TDM SUPERVISORY CHANNEL

James O. Edson, Mansfield Township, Warren County, and Lewis C. Thomas, North Plainfield, N.J., assignors to Bell Telephone Laboratories, Incorporated, New York, N.Y., a corporation of New York Filed Dec. 28, 1962, Ser. No. 248,127
10 Claims. (Cl. 179—15)

This invention relates to data communication transmission systems in general and to minimum bandwidth multiplexing systems for combining a plurality of data message channels and a common signaling channel in one transmission facility in particular.

The increasing demand for data communication services has generated unanticipated pressures on available transmission facilities. Heretofore data communication services have been provided by teletypewriter systems furnished generally on a private leased-wire basis. Public record communication services, as by telegraph, have been available only on an individual message basis. The cost of furnishing these services has been high and hence the rates charged have remained high. It is now proposed to adapt the extensive and omnipresent public switched voice telephone network to the handling of data traffic. This network is already in existence. It remains for systems to be devised which will make maximum use of voice telephone facilities for data communication purposes. Provision of data communication services over the switched telephone network will make possible the extension of flat-rate and extended-area tariff structures, common with voice services, to data services.

Accordingly, it is an object of this invention to effect the efficient utilization of voice trunking facilities for data communications services.

It is another object of this invention to concentrate data communications traffic from a plurality of incoming trunk circuits into a lesser number of interoffice and toll trunks.

It is a further object of this invention to provide full duplex data transmission for a plurality of data channels over a single four-wire voice toll facility.

It is yet another object of this invention to transmit supervisory signals for a plurality of data channels over the same voice facility as the message traffic.

It is a still further object of this invention to combine a plurality of data message channels and a common supervisory channel in one voice transmission facility.

In accordance with this invention these and other desirable objects are attained by deriving from a good quality voice toll transmission facility a plurality of narrow-band, frequency-shift message channels and a common time-divided supervisory signaling channel all multiplexed together on a frequency-division basis within a three-thousand-cycle bandwidth. The terminal equipment required for this derivation comprises a plurality of individual duplex data trunk circuits incoming to a telephone toll office, a data channel circuit associated with each trunk circuit for translating the baseband message signal to an assigned channel, a supervisory signaling channel for sampling the line status of each trunk circuit and generating a time-divided pulse train indicative of such line status, a carrier supply circuit for generating the appropriate frequencies for effecting frequency translations between baseband frequencies and assigned channel frequencies, a line circuit for combining the message and supervisory channels onto a voice-frequency transmission band for each transmission direction, and a four-wire voice transmission facility. Only the lower sideband is transmitted in each channel.

Provision is further made to distinguish originating from terminating data calls on each trunk circuit. Each trunk circuit when originating is assumed to transmit data calls as a frequency-shift signal centered near 1000 cycles and to receive incoming data calls as a frequency-shift signal centered near 2000 cycles. The reverse situation holds when the trunk circuit is at the terminating end of a connection. This arrangement permits each two-wire trunk to operate on a two-way basis. Each trunk circuit therefore marks itself originating or terminating to the channel circuit. Responsive to this signal the frequencies selected from the carrier supply circuit for each channel circuit are applied to modulator and demodulator elements to reflect the terminating or originating status of the call with respect to that terminal.

Signals transmitted by the supervisory channel indicate the "on-hook" and "off-hook" status of the trunk circuits at each end of the connection. Signaling from the trunk circuits is assumed to be by means of the so-called "E" and "M" lead system. In this system an "E" and an "M" lead are associated with each trunk. A ground on the "M" lead indicates the off-hook status of the near trunk and a ground on the "E" lead indicates the off-hook status of the far trunk. With the aid of signals on these two leads supervisory signals are extended between the two terminals of a through-trunk connection. According to this invention, the "M" leads from each trunk are sampled sequentially to form a time-divided digital pulse train which in turn controls a frequency-shift modulator. The modulator output is then frequency-division multiplexed onto the voice transmission facility just below the lowest data channel. In the incoming direction the frequency-shift signal train from the far terminal is demodulated into its digital form. The digital pulse train is demultiplexed and the information contained in each time slot is distributed to the several "E" leads connecting to the individual trunk circuits.

A common carrier supply circuit furnishes the eight carrier frequencies required to translate between the six message channel circuits and the individual trunk circuits, in addition to the frequencies required to synchronize the supervisory channel signals. The assigned channel frequencies are chosen to be harmonically related in order to lock them all to a single stable master oscillator.

A feature of this invention is the use of all-electronic switching logic in the supervisory signaling circuit.

Another feature of this invention is that the channel circuit operates at fixed gain during call set-up and at controlled gain while the data message is being transmitted.

Other objects, features and advantages of this invention will become apparent from a consideration of the following detailed description and the drawing in which.

Figures 1, 2:
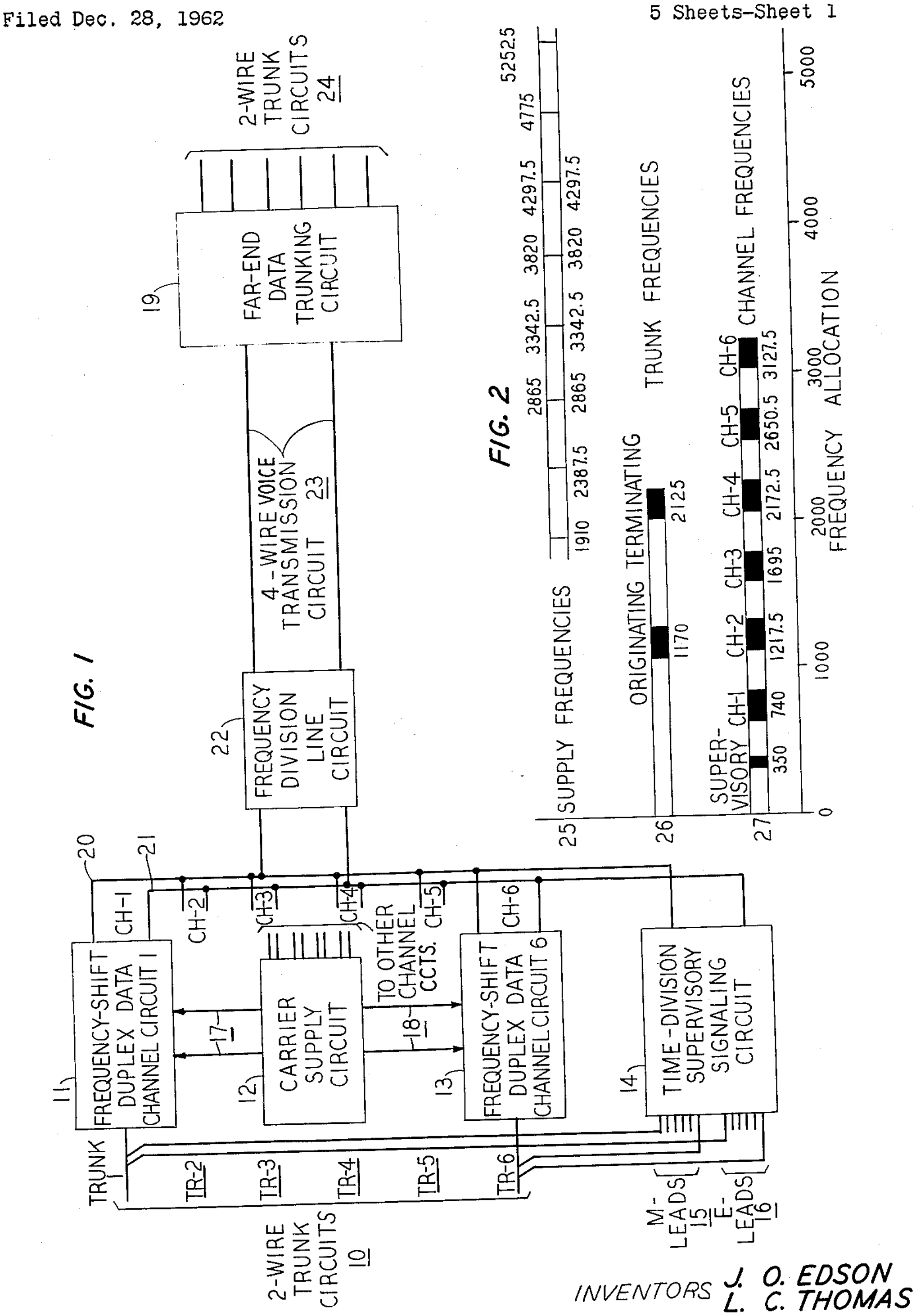
FIG. 1 is a block diagram of a data trunking system in accordance with this invention.
FIG. 2 is a frequency allocation diagram for a particular embodiment of this invention.

The overall arrangement of a data trunking system according to this invention is shown in FIG. 1. On the left are a plurality of leads 10 separately designated "Trunk 1" through "Trunk 6." Each of these trunks is assumed capable of handling a data call on a two-way full duplex basis by virtue of the fact that the data signal for each direction of transmission is confined to narrow frequency band subchannels centered about spaced subcarriers within the voice frequency band. Central office switching equipment is also assumed to be located to the left side of this figure of the drawing. Also associated with each trunk circuit are the normal signaling leads. Shown here, for example, are the "M" leads 15 for outgoing supervisory signaling and "E" leads 16 for incoming supervisory signaling.

This invention provides novel means for the transmission of data and supervisory signals from one toll central office represented by the indicated trunk circuits to another similar toll central office over existing four-wire voice transmission facilities at maximum efficiency from the standpoint of data messages per voice circuit. In furtherance of this purpose FIG. 1 indicates a separate channel circuit, such as, block 11 for individual Trunk Circuit 1 and block 13 for individual Trunk Circuit 6, for each trunk circuit. Each channel circuit has a two-wire trunk connection 10 on the left and four-wire connections 20 and 21 on the right. These circuits are capable of two-way duplex frequency-shift transmission of binary data signals. Each channel circuit differs from the others in being assigned a unique channel frequency. The frequency of the signals appearing on lines 20 and 21 for each channel circuit are determined by the frequencies supplied on leads such as leads generally designated 17 and 18 for channel circuits 11 and 13, respectively, from carrier supply circuit 12.

By way of specific example each trunk circuit 10, when originating a data call, transmits a frequency-shift signal centered at 1170 cycles per second and responds to an incoming frequency-shift signal centered at 2125 cycles per second. The terminating trunk circuit at a distant central office represented in FIG. 1 by trunk circuits 24 receives frequency-shift data signals centered at 2125 cycles per second and transmits answering frequency-shift data signals centered at 1170 cycles per second. The frequency shift in each instance is plus or minus 100 cycles per second from the stated nominal subcarrier frequencies.

This data trunking system operates compatibly with data sets described in the joint patent application of T. L. Doktor, G. Parker, L. A. Weber and H. M. Zydney, Serial No. 141,672, filed September 29, 1961, now Patent No. 3,113,176. These data sets, located on a business subscriber's premises, originate calls on 1170 cycles and receive on 2125 cycles.

Inasmuch as the line circuits to the right of the channel circuits are four-wire and the trunk circuits are two-wire a standard four-wire terminating network is included within the channel circuit.

The same line frequencies are assigned to each channel regardless of the direction of transmission. Therefore, two frequencies are supplied to each channel circuit as indicated by double leads 17 and 18 to effect the frequency translation between the assigned line frequencies and the trunk frequencies. These double leads are interchanged within the channel circuit under the control of another signaling lead (not shown) from the trunk circuits depending on whether the particular channel is originating or terminating at the terminal shown in FIG. 1.

In addition to the six data channel circuits indicated as making up a data trunking terminal according to this invention, a time-division supervisory circuit 14 is also shown in FIG. 1. This circuit operates to generate in the outgoing direction a frequency-shift data train constructed from periodic samples taken from M-leads 15 associated with each trunk circuit 10. In the incoming direction a frequency-shift data train is demodulated to baseband form and the condition of each time slot is relayed to each E-lead 16 as an indication to each trunk circuit 10 of the line status of the respective distant trunk circuit 24. The line side of supervisory signaling circuit 14 is connected to lines 20 and 21 as are the line sides of channel circuits 11 and 13. Supervisory circuit 14 is synchronized from frequencies generated in carrier supply circuit 12 over paths not shown in FIG. 1.

Frequency-division line circuit 22 forms the final link between the channel and supervisory circuits and the four-wire line 23. This circuit combines all the channel frequencies and provides the proper impedance match and transmitting level to the voice circuit 23. At the far-end of four-wire line 23 is a duplicate trunking system represented by block 19.

FIG. 2 summarizes the frequency allocations of a practical illustrative data trunking terminal according to this invention. The frequencies used in the system extend from about 315 to 5252.5 cycles per second. On line 26 are shown the frequencies associated with each trunk circuit 10. The nominal subcarrier frequency for originating data calls is 1170 cycles per second and the corresponding frequency for terminating calls is 2125 cycles per second. The black bar associated with each subcarrier frequency extends 100 cycles on either side of the nominal subcarrier. Thus, a single voice-frequency band can handle a two-way duplex or data call on each trunk circuit with ample guard frequency space.

On line 27 of FIG. 2 are shown the line frequencies allocated to each half of the four-wire transmission circuit 23 of FIG. 1. Channels 1 through 6 are assigned nominal center frequencies extending from 740 cycles per second and every 477.5 cycles per second thereafter to 3127.5 cycles per second. Each channel occupies a useful bandwidth of plus and minus 100 cycles about the nominal subcarrier frequency as indicated by the black bars. The white space remaining is for guard space to avoid interchannel crosstalk at the maximum contemplated bit rate of 150 per second. Only the 350-cycle-per-second nominal subcarrier frequency for the supervisory channel is not separated by the same frequency difference from the lowest data channel carrier as the data channel carriers are themselves. This last frequency is generated directly in supervisory channel circuit 14.

The channel subcarrier frequencies are derived by intermodulating the trunk frequencies with selected frequencies from carrier supply circuit 12. Eight carrier frequencies only are required to effect the frequency translations for all six data channels between trunk and channel frequencies. The six supply frequencies shown above the bar graph on line 25 are used in the successive channel circuits to translate from the terminating trunk frequency, 2125 cycles per second, to the respective channel subcarrier frequencies. Similarly, the six supply frequencies shown below the bar graph on line 25 are used in the successive channel circuits to translate from the originating trunk frequency, 1170 cycles per second, to the respective channel subcarrier frequencies. It is apparent that four frequencies shown above the line are identical to four shown below the line and therefore a total of eight carrier supply frequencies suffice to handle six channel circuits. Low-pass filters are provided in both the modulator and demodulator sections of the channel circuits so that only one sideband is transmitted in each channel.

The following table lists the channel frequencies and the modulating carrier frequencies required for each transmission direction. The frequencies marked "lower" are applied to the modulator section and those marked "upper," to the demodulator section when the associated trunk circuit is originating data calls. The reverse arrangement is used when the particular trunk circuit is at the terminating end of a connection.

TABLE I

| Channel No. | Channel Frequency | Modulating Frequency | |
|---|---|---|---|
| | | Lower | Upper |
| 1 | 740 | 1,910 | 2865 |
| 2 | 1,217.5 | 2,387.5 | 3,342.5 |
| 3 | 1,695 | 2,865 | 3,820 |
| 4 | 2,172.5 | 3,342.5 | 4,297.5 |
| 5 | 2,650 | 3,820 | 4,775 |
| 6 | 3,127.5 | 4,297.5 | 5,252.5 |
| Supervisory | 350 | ------------ | ------------ |

*Carrier supply circuit*

Figure 3:
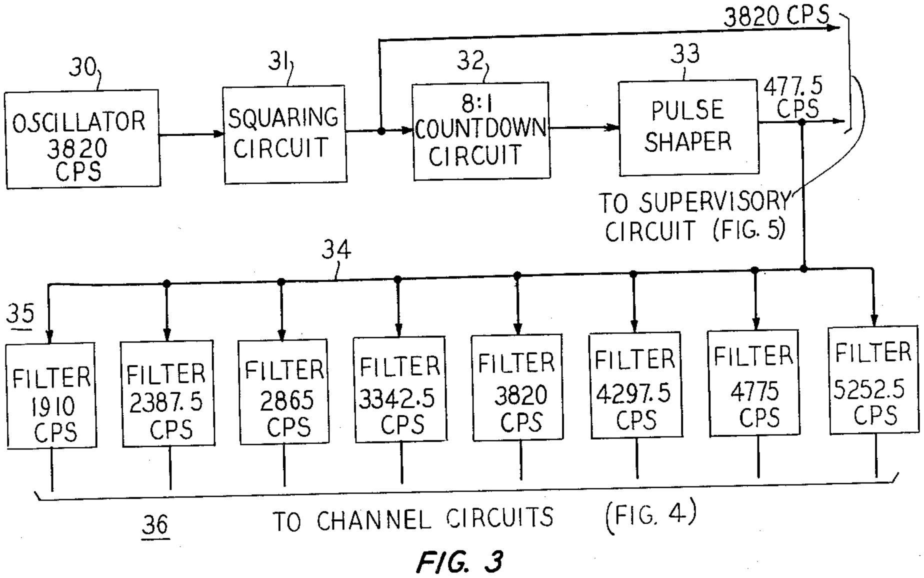
FIG. 3 is a block diagram of a carrier supply circuit useful in the practice of this invention.

The carrier supply circuit shown in block diagram form in FIG. 3 is a convenient embodiment for implementing block 12 in FIG. 1. The purpose of the carrier supply circuit is to generate and distribute the eight carrier frequencies needed for modulation and demodulation in each channel circuit (blocks 11 and 13 in FIG. 1) and to provide two clock frequencies to the supervisory signaling circuit (block 14 in FIG. 1). This circuit functions on an analog to digital to analog basis to generate the required frequencies from one crystal controlled oscillator.

The carrier supply circuit comprises a master sinusoidal oscillator 30; a squaring circuit 31; an eight-to-one, three-stage binary countdown circuit; a pulse shaper 33; and a plurality of filters 35, each sharply tuned to a particular harmonic of the fundamental pulse shaper output.

The operation of the carrier supply circuit depends on the stability of oscillator 30, which is preferably crystal-controlled to be free-running at 3820 cycles per second. The sinusoidal output of oscillator 30 is converted to a symmetrical square wave by squaring circuit 31. The latter may comprise an overdriven amplifier followed by a one-shot multivibrator with a carefully controlled time-constant equal to half the period of a cycle of the oscillator output wave in order to insure the generation of a symmetrical square wave. The output of squaring circuit 31 drives a binary counter circuit 32, which includes three bistable countdown stages in tandem. Thus, the output frequency of the countdown circuit is 477.5 cycles per second. Pulse shaper 33 follows countdown circuit 32 and forms sharp pulses at the last-mentioned frequency. The shaper may readily be comprised of another one-shot multivibrator or monopulser, but having a very short time constant. The sharper the pulses, as is well known, the richer the harmonics. The output of pulse shaper 33 is applied on lead 34 to a plurality of sharply selective filters, generally designated 35, each tuned to a particular harmonic of 477.5 cycles per second, specifically the fourth through the eleventh. Each of these frequencies is available on one of the output leads 36 for application to the appropriate channel circuit as shown in Table I.

In addition, the 3820-cycle ouput from squarer 31 and the 477.5-cycle output from shaper 33 are made available to supervisory signaling circuit 14 as shown.

In a practical trunking system duplicate carrier supply circuits may be conveniently provided so that the system may be shifted from one supply to the other in case of a trouble condition in one of them. Also, a single carrier supply circuit may readily handle more than one set of channel circuits in the same central office.

*Channel circuits*

Figure 4:
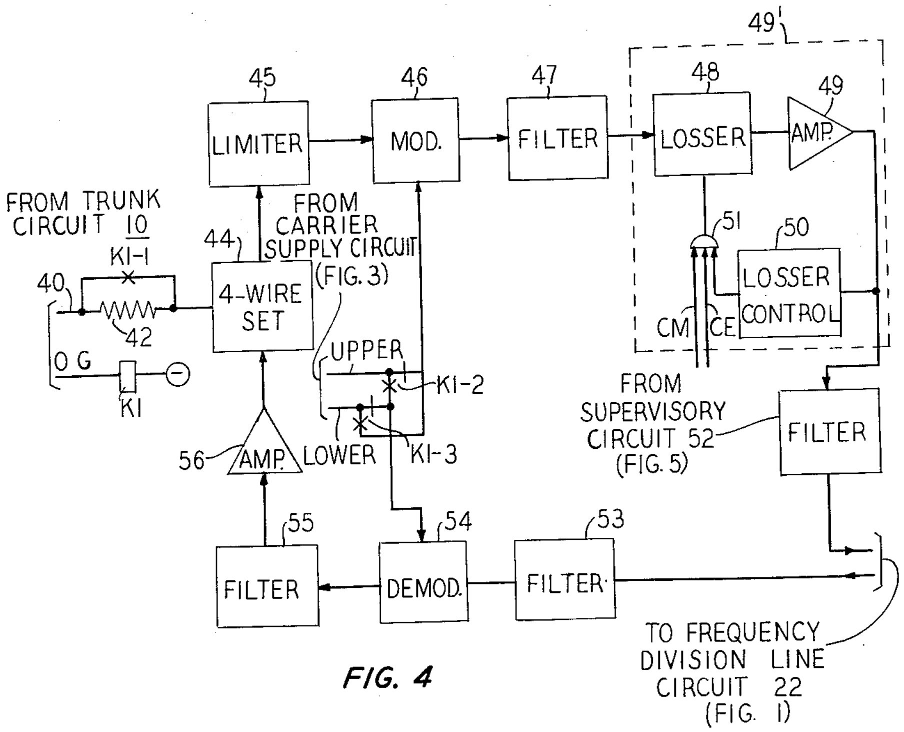
FIG. 4 is a detailed block diagram of a channel circuit according to this invention.

According to the frequency allocation of the particular embodiment of the invention being described in detail, six channel circuits can be used with a single four-wire voice transmission facility. Each of these channel circuits is identical except for the passband of filters associated with modulators and demodulators therein and the carrier supply frequencies applied thereto. FIG. 4 shows a representative arrangement for a channel circuit.

A channel circuit comprises a modulator section and a demodulator section both connected to a trunk circuit 10 over a two-wire path designated 40. A four-wire terminating set 44 provides effective isolation between modulator and demodulator sections in a conventional manner.

The modulator branch at the top of FIG. 4 comprises a limiter 45, modulator 46, a low-pass filter 47, an automatic gain controlled amplifier 49' including amplifier 49, losser 48, losser control 50 and gate 51 and a transmitting filter 52. The modulator translates an outgoing data signal from trunk circuit 10 to a particular assigned channel frequency on the outgoing portion of four-wire line 23.

The demodulator branch along the bottom of FIG. 4 comprises a receiving filter 53, a demodulator 54, a low-pass filter 55, and an amplifier 56.

The demodulator translates the incoming line signal on the incoming portion of four-wire line 23 from the assigned channel frequency to the baseband frequency on trunk circuit 10.

The trunk side of the channel circuit includes a switched attenuator represented by resistor 42. A pair of normally open make relay contacts K1–1 connected in shunt of the attenuator is controlled by a relay K1 operated in turn from a lead OG (outgoing) from the trunk circuit. This same relay controls the connections through its transfer contacts K1–2 and K1–3 of the modulator 46 and demodulator 54 to the respective upper and lower carrier frequencies from the carrier supply circuit. The attenuator is provided to compensate for the difference in power between the 1170- and 2125-cycle data signals from the trunk circuit. When the trunk circuit under consideration is originating a call, a ground is placed on the OG lead to operate relay K1, thereby removing the attenuator 42 from the circuit. At this time the outgoing trunk frequency is 1170 cycles and the incoming trunk frequency is 2125 cycles. The level of the two trunk frequencies is thus equalized. At the same time transfer contacts K1–2 and K1–3 operate to connect the upper carrier frequency to the demodulator and the lower carrier frequency to the modulator. If the call is not being originated at the terminal being considered, the outgoing frequency is 2125 cycles and the relay is unoperated, thereby interchanging the carrier supply frequencies to the modulator and demodulator and attenuating the 1170-cycle signal entering the trunk circuit.

In the modulator branch outgoing signals are limited in a conventional limiter 45 to prevent signals of excessive amplitude from being applied to modulator 46. Modulator 46 is conveniently a balanced switch-type modulator for translation to the line frequency of the particular assigned channel in accordance with Table I. The resultant line frequency is the difference between the carrier supply frequency applied through the K1 contacts and the trunk frequency. The modulator output is applied to filter 47 which passes only the lower sideband of the modulation process. This lower sideband signal is incident on an automatic-gain-controlled amplifier, including losser 48, amplifier proper 49 and losser control 50. Losser 48 and losser control 50 may be a shunt diode network with a variable bias related to the output level of amplifier 49′ of the type disclosed in B. J. Morrison United States Patent No. 2,228,866, granted January 14, 1941. Regulation is provided only when the input signal exceeds a predetermined minimum. The control is suitably of the backward-acting type as shown, which develops a direct current for regulating the losser diode impedance.

Coincidence or AND-gate 51 which interconnects losser control 50 and losser 48 is provided for the purpose of inhibiting automatic gain control action during the call set-up interval so that signaling tones are delivered at maximum amplitude. Signals from the supervisory circuit as explained more fully hereinafter appear on the leads marked CM and CE. Lead CM furnishes an enabling input when the calling end of the trunk goes off-hook. Similarly, lead CE furnishes an enabling input when the called end of the trunk goes off-hook. Only when both CM and CE leads are enabled can the automatic gain control operate. During call-progress signaling, therefore, amplifier 49′ operates at maximum gain unregulated. During the message interval, however, the gain is regulated.

The output of amplifier 49 connects to the common channel circuit output line through transmitting filter 52 in a conventional manner.

In the demodulator branch incoming signals from the toll transmitting facility at the assigned channel frequency are admitted to demodulator proper 54 through bandpass filter 53. The received data signal is translated to baseband (trunk-circuit) frequency according to whether the trunk circuit is in the terminating or originating mode as previously discussed. The demodulating carrier frequency applied is determined by the position of contacts K1–2 and K1–3 of relay K1 controlled from the trunk circuit. The demodulator proper may be of the same switching type employed in the modulator. The lower sideband of the demodulator output is selected in low-pass filter 55 and applied to four-wire terminating set 44 through fixed-gain amplifier 56. The recovered baseband signal is delivered to the trunk circuit over line 40.

Modulator 46 and demodulator 54 may conveniently be transistorized for minimum space occupancy.

All channel circuits are identical except for filters 47 and 52 in the modulator branch and filters 53 and 55 in the demodulating branch. These are selected according to the requirements of Table I.

*Supervisory signaling circuit*

The purpose of the supervisory signaling circuit is to provide two-way supervisory signaling information for up to six message channel circuits over a narrow frequency band on the same voice transmission facility. In the outgoing direction the switchhook states from the associated trunk circuits are sampled and time-division multiplexed to form a binary data train which controls a frequency-shift modulator. In the incoming direction the frequency-shift keyed signal is demodulated to form a binary data train from which synchronism is recovered, switchhook states are extracted and passed on to the appropriate trunk circuits. In addition, a time slot is reserved for exchanging trouble information between terminals so that in case of loss of signal, carrier or synchronism all trunks can be marked busy.

Figure 5:
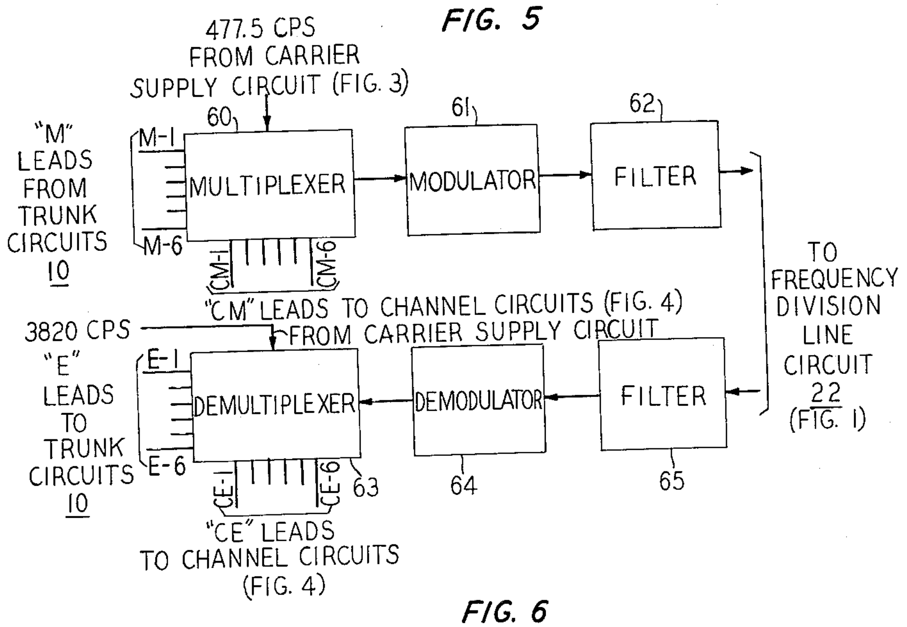
FIG. 5 is a block diagram of a supervisory signaling channel circuit according to this invention.

FIG. 5 is an overall block diagram of the supervisory signaling circuit according to this invention. The outgoing multiplexing branch is essentially independent of the incoming demultiplexing branch, but each branch is required at each terminal of the transmission facility for two-way signaling.

The multiplexing branch comprises multiplexer proper 60 for sequentially scanning trunk circuit conditions on leads M–1 through M–6 in the several trunk circuits and for forming a binary pulse train therefrom, modulator 61 for forming a frequency-shift signal pattern from the binary pulse train about a carrier-frequency centered in the low end of the voice-frequency band, and transmitting low-pass filter 62. The timing of multiplexer 60 is obtained as indicated from a 477.5-cycle square wave from the carrier supply circuit diagrammed in FIG. 3. Multiplexer 60 also supplies signals on leads CM–1 through CM–6 at a different clamping level to the channel circuits to help determine the operating mode of the automatic gain control circuits in the modulating branches of the channel circuits. Modulator 61 generates a frequency-shift signal centered on a 350-cycle carrier wave having a swing of plus and minus 35 cycles. The carrier wave frequency is self-generated in modulator 61 and is preferably non-harmonically related to any of the channel frequencies. Filter 62 connects to the voice-transmission facility as indicated in FIG. 1. The modulator may be constructed according to conventional techniques.

The demultiplexing branch comprises receiving low-pass filter 65 connected to the voice-transmission facility 23, demodulator 64 for forming a binary pulse train and demultiplexer 63 for sampling the binary pulse train under the clocking control of the carrier supply circuit and distributing these samples to the several trunk circuits. Demodulator 64 responds to frequency-shift signals with a center-frequency of 350 cycles and a deviation of plus and minus 35 cycles in a conventional manner. The output is a two-level binary signal train. Demultiplexer 63 derives switchhook information from the signal train and presents it to the trunk circuits on leads E–1 through E–6. Corresponding signals on leads CE–1 through CE–6 at a different clamping level help to enable the automatic gain control amplifiers in the channel circuits. These leads indicate the switchhook status of the far-end trunk circuits. The demultiplexer in addition derives bit synchronization and framing information from the signal train.

Figure 6:
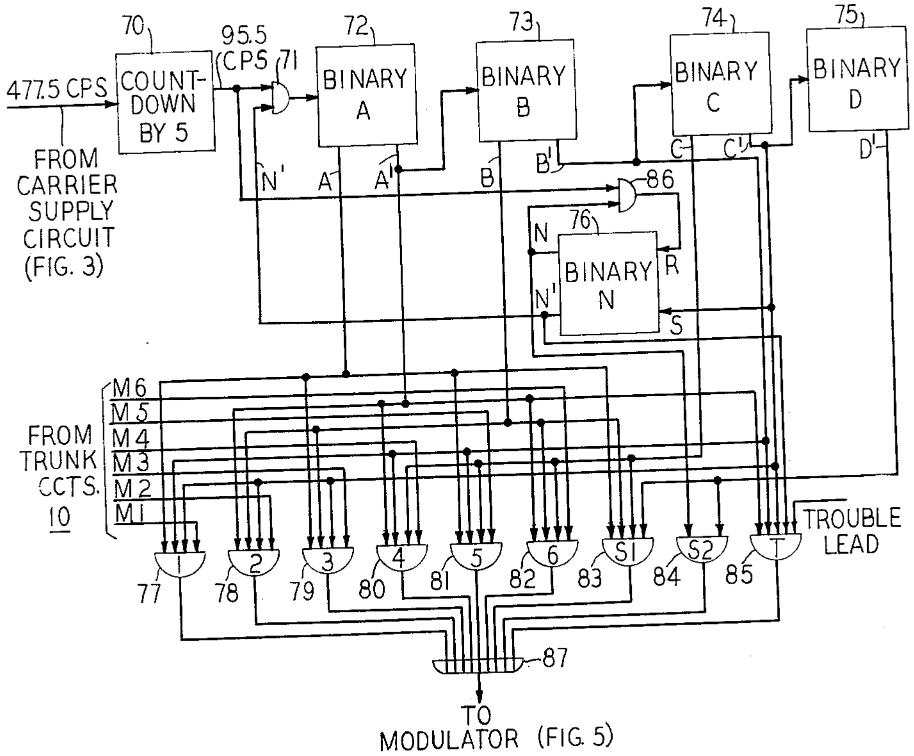
FIG. 6 is a detailed block diagram of a representative embodiment of a supervisory channel multiplexer circuit useful in the practice of this invention.

FIG. 6 depicts multiplexer 60 in more detail. The multiplexer is essentially a clock-controlled parallel-to-serial converter in the illustrative embodiment. The circuit is adaptable to implementation by so-called NOR-logic circuits.

Bistable binary countdown circuits, coincidence gates and a buffer gate are shown in FIG. 6. The binaries have complementary outputs designated by primed and unprimed capital letters. When there is a positive or "one" output on one lead there is a negative or "zero" output on the other lead. Repeated inputs of the same polarity cause the outputs to alternate states. Binaries can also be arranged with two input points called "set" and "reset." An input signal applied to either of these input points causes a particular corresponding output state to be assumed instead of the opposite state. The coincidence gates, represented by semicircles, produce an output signal only when all inputs are simultaneously activated. A buffer gate, on the other hand, produces an output when any input is activated, but it prevents interactions among the several inputs.

*Multiplexer*

The representative embodiment of a multiplexer for the supervisory signaling circuit shown in FIG. 6 comprises a countdown-by-five circuit 70 operating from a 477.5-cycle source in the carrier supply circuit; a time-slot memory circuit including binary cells 72 through 74, an inhibiting binary cell 76 and a framing-rate binary 75; steering gates 77 through 85; and buffer gate 87. Countdown circuit 70 might include three binary stages normally counting down by eight from the 477.5-cycle input square wave, but having a prematurely triggering feedback from the output stage to the first two stages, thereby resulting in a countdown of five. The output at 95.5 cycles provides a timing pulse for the serial pulse train to be generated by the multiplexer. A differentiator can be used in the output of the countdown circuit to produce sharp output pulses.

Figures 8, 9:
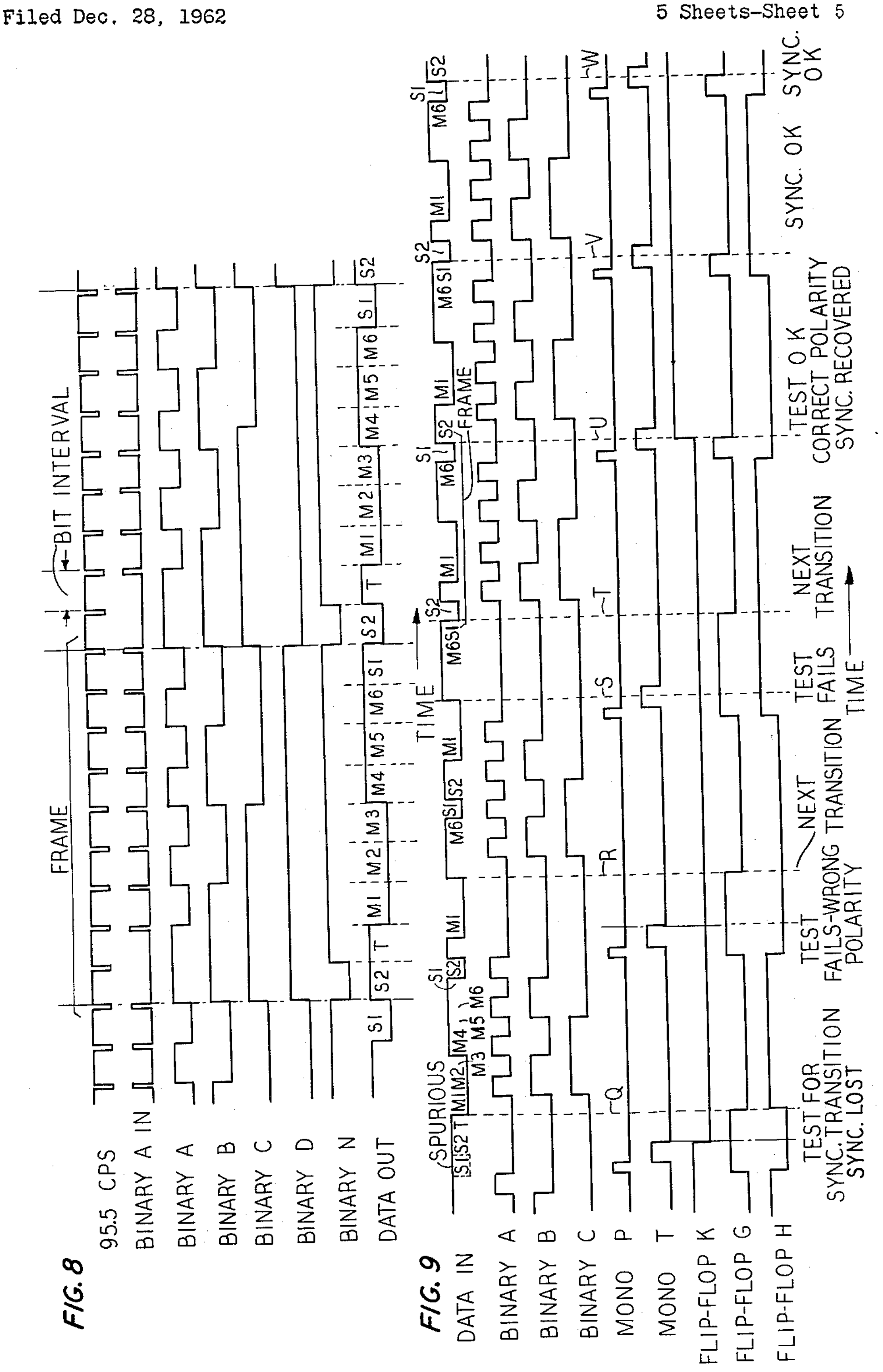
FIG. 8 is a waveform diagram which is helpful in understanding the operation of the supervisory channel multiplexer shown in FIG. 6.
FIG. 9 is a waveform diagram which is helpful in understanding the operation of the supervisory channel demultiplexer shown in FIG. 7.

FIG. 8 is a waveform diagram of interest in connection with the multiplexer of FIG. 6. The top line shows the pulse output from countdown 70. The interval between pulses constitutes a bit interval of about 10.5 milliseconds duration in the pulse train. Nine intervals constitute a frame within which a two-bit start sequence, an optional trouble pulse and a supervisory signal pulse for each of six channel circuits are contained.

The output of countdown 70 drives the three binary stages 72 through 74 to divide the 95.5-cycle pulse rate by eight. The direct and complementary outputs of each of these binaries, also marked A, B and C, are made separately available. An auxiliary binary cell 76, also marked N, is set once every counting cycle by the C′ output of binary 74. The N′ output of binary N normally enables coincidence gate 71 in series with the input to binary A. As soon as binary N is set, however, output N′ disappears and one pulse from countdown 70 to binary A is blocked. The resetting input to binary N is connected to its own unprimed output through coincidence gate 86, which has an enabling input connected to the output of countdown 70. Therefore, the trailing edge of the pulse suppressed from the input of binary A causes the resetting of binary N.

The input to binary A is shown on the second line of FIG. 8. One pulse is seen to be suppressed every frame. The polarity inversion shown occurs in AND-gate 71. The unprimed outputs of binaries A, B and C are shown on the next three lines of FIG. 8.

An additional binary 75, also designated D, is driven by binary C and produces a change of state once per frame. The output of this binary controls the start sequence in the pulse train.

Steering gates 77 through 85 are connected respectively to the leads M1 through M6, to binary D (S1 and S2) and to a trouble lead T, if used. By means of combinational logic the several primed and unprimed outputs of binaries A through C enable each of the gates in sequence during each frame. The following Table II shows the enabling inputs to the several steering gates from the time-slot memory binary counters 72 through 76.

TABLE II

| Gates | Time Slot Memory Outputs | | | | | | | | |
|---|---|---|---|---|---|---|---|---|---|
| | A | A′ | B | B′ | C | C′ | D′ | N | N′ |
| 1 | x | ---- | ---- | x | ---- | x | ---- | ---- | ---- |
| 2 | ---- | x | x | ---- | ---- | x | ---- | ---- | ---- |
| 3 | x | ---- | x | ---- | ---- | x | ---- | ---- | ---- |
| 4 | ---- | x | ---- | x | x | ---- | ---- | ---- | ---- |
| 5 | x | ---- | ---- | x | x | ---- | ---- | ---- | ---- |
| 6 | ---- | x | x | ---- | x | ---- | ---- | ---- | ---- |
| S1 | x | ---- | x | ---- | x | ---- | x | ---- | ---- |
| S2 | ---- | ---- | ---- | ---- | ---- | ---- | x | x | ---- |
| T | ---- | x | ---- | x | ---- | x | ---- | ---- | x |

A comparison of Table II above with the waveforms of FIG. 8 clearly shows that each steering gate is enabled during only one time slot per frame. For example, in the M1 time slot, the time interval in which lead M1 is sampled occurs when binary 9 output is down and the complement of the outputs of binaries B and C are down, i.e., all of the same polarity. Similarly, the other time slots can be derived. The ultimate output of the steering gates depends on the condition of the M1 through M6 leads. An arbitrary, but representative, output pulse train in non-return-to-zero form is shown on the last line of FIG. 8. The time slots, or sampling intervals, occur between the vertical dotted lines. The pulse train could indicated that trunks 1 through 3 are on-hook during two successive frames and trunks 4 through 6 are off-hook during two successive frames. Each frame is approximately 94.3 milliseconds long. Thus, each trunk signaling lead is examined nearly eleven times a second.

The generation of the start sequence S1–S2 depends on the output of binary D which cycles once every other frame. Thus, the start sequence alternates from frame to frame with transitions of opposite polarity as shown. This arrangement is used for frame synchronization recovery in the demultiplexer.

Steering gate 85, also marked T, is indicated as sending a trouble indication to the far-end trunk circuit. The source of the trouble indication is not shown. The far-end trunk may use a timer and if the trouble condition persists for some minimum time, such as three seconds, may mark all incoming signals as on-hook and open all connections. The inclusion of this time slot in the assumed train is for the purpose of illustrating that other information besides switchhook status can be conveyed by the supervisory signaling system.

Finally, all the individual steering gate outputs are fed serial-fashion through buffer gate 87 to the modulator. The latter is not shown in detail because there are many well known frequency-shift keyed oscillators which can perform this function.

*Demultiplexer*

The pulse train generated in the multiplexer just described and transmitted as a frequency-shift signal by the modulator is received at the opposite terminal and is demodulated in a demodulator of known construction, details of which form no part of this invention. The demodulated pulse train is delivered to a demultiplexer, the detailed block diagram of which is shown in FIG. 7.

The demultiplexer receives from the demodulator a pulse train from which can be derived framing reference, switchhook status of the far-end trunk circuits, and optionally the trouble status of the far-end supervisory circuit. The switchhook states are delivered to the six connecting trunk circuits on leads E1 through E6.

In order for the demultiplexer to determine which time slot in the pulse train has the requisite information, framing and bit synchronization information must be recovered. Therefore, a local clock must be synchronized with the start sequence pulses in the data train. For this reason a major portion of the demultiplexer is devoted to synchronization recovery.

Figure 7:
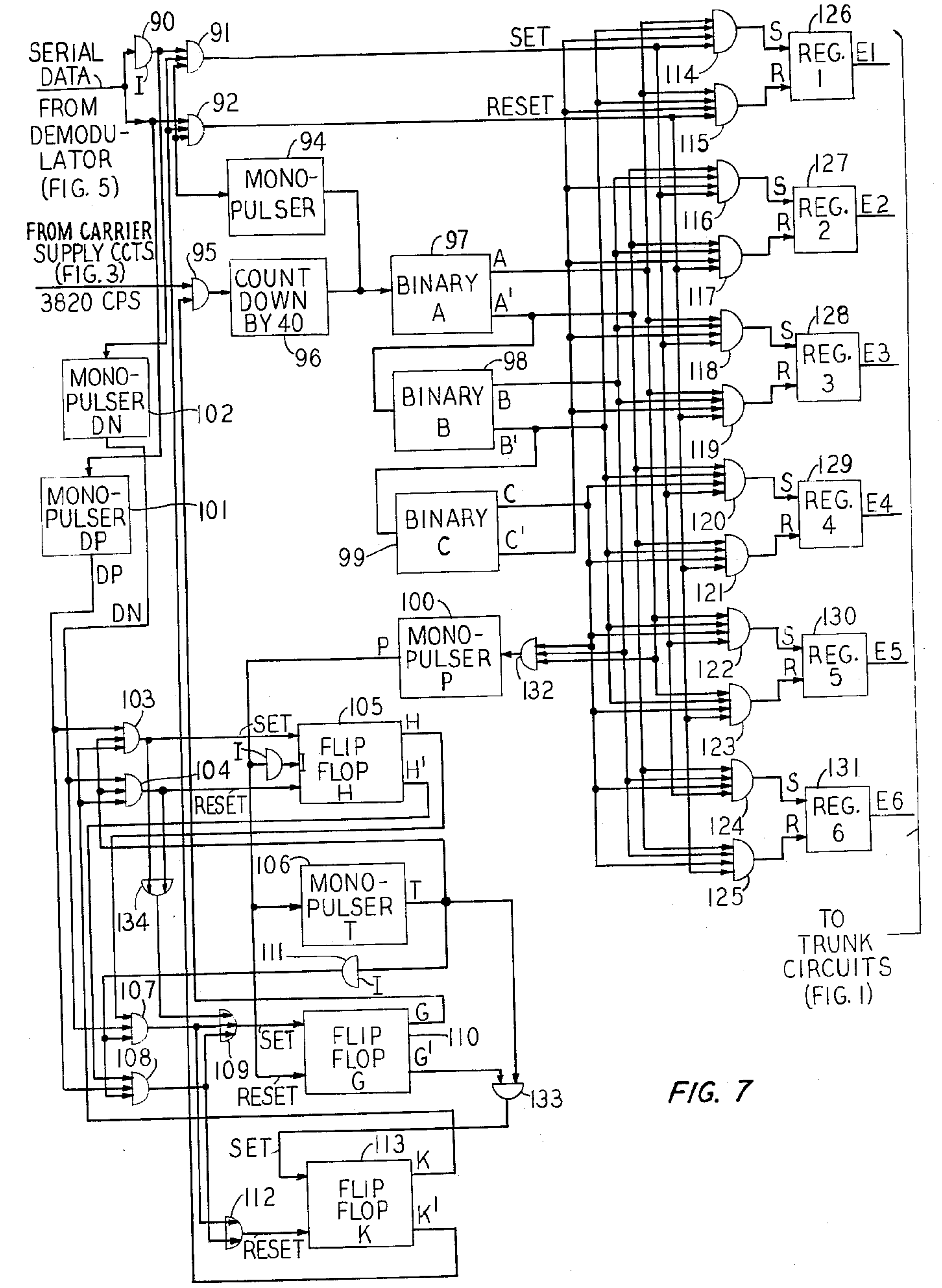
FIG. 7 is a detailed block diagram of a representative embodiment of a supervisory channel demultiplexer circuit useful in the practice of this invention.

The demultiplexer shown in FIG. 7 comprises a countdown-by-forty circuit 96 driven by a local 3820-cycle clock signal from which a 95.5-cycle bit rate signal is derived; a further three-stage countdown circuit including binaries 97, 98 and 99 from which the frame rate is derived; a start-stop logic circuit controlled by the start sequence in the pulse train including monopulsers 100, 101, 102 and 106, and flip-flops 105, 110 and 113; steering coincidence gates 114 through 125; and output registers 126 through 131.

The local carrier supply furnishes a 3820-cycle square wave through coincidence or AND-gate 95 to countdown circuit 96. The latter circuit provides a countdown by forty to the bit-rate frequency of the signal train. The large countdown ratio permits synchronization at any one of forty subdivisions within a bit interval. AND-gate 95 can be opened and closed by the logic circuitry later described to start counting down in phase with a start sequence in the incoming pulse train.

Since the frame rate is one-ninth the bit rate, a divide-by-nine counter would seem to be required. However, a divide-by-eight counter is used here instead and stopped for one bit interval in each frame. During the stop interval the pulse train is examined for the presence of a start sequence. The steering memory comprises binary counters 97, 98 and 99, also designated A, B and C. These are driven in tandem from the 95.5-cycle output of counter 96. An output from each of these binaries is taken and applied to coincidence AND-gate 132 which drives a monostable flip-flop or monopulser 100, also designated P, once every frame. AND-gate 132 produces an output only on the eighth count and triggers monopulser P, which generates a narrow pulse of predetermined length. The leading edge of this pulse resets flip-flop 110, also designated G. The G output of this flip-flop normally enables gate 95 which passes the 3820-cycle square wave from the local oscillator to countdown 96. When flip-flop G is reset, the 3820-cycle wave is blocked and the steering memory, including binaries A, B and C, ceases its count.

The serial pulse train is received in the upper left-hand corner of FIG. 7 and is immediately split into two paths, one of which includes polarity inverter 90. The letter I adjacent to symbol 90 indicates that this is an inverter and not a coincidence or buffer gate. The direct and inverted signal data are brought to separate monopulsers 101 and 102, also designated DP and DN (data positive transition and data negative transition) which generate sharp output pulses on every transition in the signal wave. Monopulser 101 produces an output on positive-going transitions and monopulser 102, on negative-going transitions.

Flip-flop 110 also designated G, is normally set on the next transition in the signal wave, provided it is of the correct polarity. It will be recalled that the start sequence alternates in polarity from one signal frame to the next. Flip-flop 105, also designated H, is provided to retain a memory of the polarity of the last transition. This flip-flop controls the setting of flip-flop G. Flip-flop H has three inputs, a complementing input controlled by the output of monopulser P, at the end of each frame a setting input controlled by positive-going transitions in the signal wave, and a resetting input controlled by negative-going transitions in the signal wave. The latter inputs are blocked except during a hunting sequence following loss of synchronization. The H output of flip-flop H in conjunction with a negative-going transition in the signal train sets flip-flop G. The H′ output in conjunction with a positive-going transition also can set flip-flop G.

An additional safeguard is incorporated in this logic control circuit. Monopulser 106, also designated T, is triggered by the trailing edge of the P pulse and generates an output pulse one bit interval in duration. Output T is inverted in inverter 111 and is applied alike to coincidence gates 107 and 108, whose inputs also include the respective H and H′ signals as well as the signal-transition outputs DP and DN of monopulsers 101 and 102. The outputs of gates 107 and 108 are combined in buffer gate 109 leading to the set input of flip-flop G. The result of this safeguard is that flip-flop G can be set only by a signal-wave transition occurring within one-bit interval after flip-flop G has blocked the counting of the steering memory, without permitting the generation of a loss-of-synchronization signal.

On the other hand, flip-flop H will enable gates 107 and 108 only if its outputs are in phase with the signal transition.

In the event that the signal-wave transition is not present or is of the wrong polarity, flip-flop 113, also designated K, is provided to generate an out-of-synchronization signal. Flip-flop K normally remains in the reset condition because its reset input is connected through buffer gate 112 to the same signals which set flip-flop G. The K′ output existing at this time enables signal input gates 91 and 92 leading to the signal registers. The K output is of a polarity at the same time to inhibit gates 103 and 104 controlling the set and reset inputs of flip-flop H.

Flip-flop K is set, however, at the end of the T pulse through coincidence gate 133 if the G flip-flop has not been returned to the set state by the occurrence of a start-sequence transition in the signal train.

FIG. 9 is a waveform diagram explanatory of the operation of the synchronization recovery system of the demultiplexer. On the first line is shown a representative data train similar to that generated in the multiplexer and shown on the last line of FIG. 8. However, it is assumed that a start-sequence S1–S2 was obliterated in transmission and it is necessary to hunt for the next correct transition. Binary A normally generates four cycles of a square wave from the 95.5-cycle wave at the output of countdown 96, followed by the suppression of one-half cycle due to the operation of flip-kop G. Binaries B and C count down successively from the output of binary A as shown in lines 3 and 4 of FIG. 9. With each complete count to eight, the pulse P is generated as shown on line 5. This pulse in turn drives the T monopulser to produce a sampling wave at the time the start-sequence should occur as shown on line 6. Flip-flop G is reset by each P pulse and should return to the set condition during the T pulse if a start sequence occurs in the correct phase. If the G flip-flop is not set by the end of the T pulse, then flip-flop K is set as shown on the third last line of FIG. 9. Flip-flop H normally changes state with each P pulse except when synchronism is lost as is indicated by the setting of the K flip-flop.

In FIG. 9 at the left on the first line a start-sequence (shown by dotted outline) should have occurred during the T-pulse interval but did not due to noise on the transmission facility, for example. Therefore, flip-flop K is set. No more data is delivered to the register, but the outputs of monopulsers DP and DN are fed to the set and reset inputs of flip-flop H through gates 103 and 104, previously inhibited. Now, a DP pulse derived from a positive transition in the data train sets the H flip-flop, and a DN pulse derived from a negative transition in the data train resets it. Because of buffer gate 134 between the outputs of gates 103 and 104 and buffer gate 109, either a DN or a DP pulse sets the G flip-flop. Gates 103 and 104 are enabled only for the duration of the P pulse after a frame-counting sequence as is obvious from an examination of FIG. 7.

The next transition occurs at vertical dotted line Q, corresponding to a signal transition between the T and M1 bit intervals. Obviously this is not a start transition, but the logic circuit tests it by enabling gate 95 to trigger countdown 96. The steering memory counts to eight and generates a P pulse, followed by a T pulse. Flip-flop G is reset. Output H has reversed polarity but the signal transition is still negative going. Thus, flip-flop G is not returned to the set condition until time R, when a positive-going transition occurs in the data wave. The counter counts again to eight. P and T pulses are generated at time S. Flip-flop H changes state and flip-flop G is reset. The transition here is the same as at time R. Therefore, flip-flop G is not returned to the set state and flip-flop K remains set. The next transition occurs at time T and is a true negative-going start transition. The counting proceeds until time V at which a positive-going transition occurs. It therefore agrees in polarity wth the output of the H flip-flop. Both G and K flip-flops are set and data distribution returns to normal. At times V and W the start signals occur normally at the correct polarity and flip-flop K remains reset.

In the absence of any synchronization troubles the direct and inverted signal data pulses are incident on coincidence gates 91 and 92. These gates are enabled when the K flip-flop is reset and during a sampling interval determined by the output of monopulser 94, which generates a fixed-duration pulse during each bit interval determined by the output of countdown circuit 96. The sampled data are distributed to the E-leads through registers, which are merely bistable circuits having set and reset inputs. For convenience the registers may control reed relays so that a ground or battery potential is available on the E-leads. The set and reset outputs of gates 91 and 92 are steered to the set (S) and reset (R) inputs of registers 126 through 131 through gates 114 through 125. These gates are paired for each register and the pairs are enabled in sequence by outputs of binaries A, B and C. The following Table III lists the inputs to the steering gates:

TABLE III

| Gates | A | A′ | B | B′ | C | C′ |
|---|---|---|---|---|---|---|
| 114–115 | X | ------- | ------- | X | ------- | X |
| 116–117 | ------- | X | X | ------- | ------- | X |
| 118–119 | X | ------- | X | ------- | ------- | X |
| 120–121 | ------- | X | ------- | X | X | ------- |
| 122–123 | X | ------- | ------- | X | X | ------- |
| 124–125 | ------- | X | X | ------- | X | ------- |

With this chart and FIG. 9 it can readily be seen that one and only one register is connected through one and only one pair of steering gates to the data input point during a given time slot. Depending on the state of the bit the register is either set or reset during the appropriate time slot. The steering gates, steering memory and registers effectively form a serial-to-parallel converter.

While this invention has been described in terms of a specific illustrative embodiment, anyone skilled in the art to which it relates will realize that there are numerous modifications that may be made without departing from the spirit and scope of the appended claims.

For example, the channel circuits provided in accordance with this invention are not restricted to the transmission of message traffic. Dialing, ringing, busy and reorder signals can also be transmitted in these narrow-band channels by appropriate terminal equipment. In a copending patent appplification, filed of even date herewith in the joint names of L. T. Anderson, I. Dorros, J. C. Ewin, L. J. Gitten, Q. D. Groves and J. R. Harris and bearing Serial No. 248,128, a dial pulsing system compatible with the narrow channel bandwidths of this invention is disclosed.

What is claimed is:

1. A multichannel data transmission system comprising
a plurality of data trunking circuits, each presenting a separate switchhook appearance,
a voice-band transmission facility,
means for deriving from said transmission facility a plurality of adjacent narrow-band message channels, one for each of said data trunking circuits,
means for translating the data on each of said trunking circuits to the individual message channels formed by said deriving means,
means for sampling the switchhook appearances of said trunking circuits in time sequence to form a supervisory signal pulse train,
means for further deriving from said transmission facility a narrow-band supervisory signal channel adjacent to said plurality of message channels, and
means for modulating the signal pulse train from said sampling means onto said supervisory signal channel.

2. In a communication system the combination of a plurality of frequency-division multiplex channels,
a time-division multiplex channel adjacent said frequency-division channels,
a plurality of message-carrying trunk circuits each of which presents an appropriate switchhook appearance,
means for modulating the messages from each of said trunk circuits onto a different one of said frequency-division channels,
means for sequentially sampling the switchhook appearances of each of said trunk circuits to obtain a series of signals representing the switchhook status of all said trunk circuits,
means for modulating said series of signals on said time-division channel,
a voice-transmission facility, and
means for combining the intelligence on said frequency-division and time-division channels into one composite signal for transmission over said facility.

3. In a communication system, the combination with a two-way, four-wire voice band transmission facility comprising,
a first and second plurality of trunk circuits at the respective ends of said transmission facility each capable of carrying independent data messages and each presenting appropriate switchhook appearances,
means for deriving a plurality of narrow-band frequency-multiplex channels on each half of said four-wire facility for messages between said first and second plurality of trunks, each half of said facility being restricted to transmission in a particular direction,
means at each end of said facility for sampling the switchhook appearances of said first and second plurality of trunks and forming trains of pulses representing said appearances, and
means for time-division multiplexing said trains of pulses onto an additional channel on each half of said four-wire facilty adjacent to said narrow-band frequency multiplex channels.

4. In a communication system,
the combination with a two-way, four-wire voice band transmission facility having originating and terminating ends comprising
a first and second plurality of trunk circuits located at the respective originating and terminating ends of said facility, each of said trunk circuits being capable of carrying independent data messages and each presenting appropriate switchhook appearances,
first modulating means at the originating end of said facility for frequency-multiplexing the messages from said first plurality of trunk circuits onto individual adjacent narrow-band channels provided by one-half of said four-wire facility,
second modulating means at the terminating end of said facility for frequency-multiplexing the messages from said second plurality of trunk circuits onto individual adjacent narrow-band channels provided by the other half of said four-wire facility,
first demodulating means at the originating end of said facility for frequency-demultiplexing messages on the individual channels of the other half of said four-wire facility to said first plurality of trunk circuits,
second demodulating means at the terminating end of said facility for frequency-demultiplexing messages on the individual channels of the one-half of said four-wire facility to said second plurality of trunk circuits,
first sampling means at the originating end of said facility for forming a train of signals indicating sequentially the switchhook states of each of said first plurality of trunks,
second sampling means at the terminating end of said facility for forming a train of pulses indicating sequentially the switchhook states of each of said second plurality of trunks,
first means at the originating end of said facility for time-division multiplexing the train of signals from said first sampling means onto a channel of one-half of said four-wire facility adjacent to the narrow-band message channels thereon,
second means at the terminating end of said facility for the time-division multiplexing the train of signals from said second sampling means onto a channel of the other half of said four-wire facility adjacent to the narrow-band message channels thereon,
first means at the originating end of said facility for demultiplexing the time-divided signal train on the one-half of said four-wire facility to each of said first plurality of trunk circuits, and
second means at the terminating end of said facility for demultiplexing the time-divided signal train on the other half of said four-wire facility to each of said second plurality of trunk circuits.

5. The communication system of claim 4 in which a single carrier generating circuit having harmonically related outputs is connected to said first and second modulating means to determine the frequency separation of said adjacent narrow-band channels.

6. The communication system according to claim 5 in which said carrier generating circuit comprises a stable master oscillator having a single-frequency output, a frequency-dividing countdown circuit connected to the output of said oscillator and having an output at a predetermined subharmonic of said single frequency, pulse-shaping means operating on the output of said countdown circuit for forming sharp spikes at said subharmonic frequency, said spikes being rich in harmonic frequency components, and a plurality of sharply tuned bandpass filters resonant at selected ones of said harmonic frequencies and having said sharp spikes incident thereon.

7. The communication system according to claim 4 in which said first and second modulating means each comprise a plurality of individual balanced modulators connected one to each individual trunk circuit for translating the data message from a base frequency level on said trunk circuit to that of an assigned message channel in said transmitting facility, a plurality of low-pass filters for transmitting one only of the sidebands generated in each of said modulators, and a plurality of gain-controlled amplifiers for the sideband transmitted by each of said filters.

8. The communication system according to claim 4 in which said first and second demodulating means comprise a plurality of bandpass filters one for each narrow band center-channel frequency occurring on said transmission facility, a plurality of balanced modulators each connected to one of the plurality of bandpass filters for translating the data message on each of said channels from the assigned channel frequency to the frequency on said trunk circuit, and a plurality of low-pass filters for suppressing one of the sidebands generated in each of said modulators.

9. The communication system of claim 4 in which each of said first and second sampling means comprise a clock source of pulses at the desired sampling rate, a countdown chain of bistable circuits having outputs at one-half, one-fourth and one-eighth the frequency of an input wave, an auxiliary bistable circuit controlled by said countdown chain to change its output state once every complete counting cycle thereof, means responsive to the output state of said auxiliary bistable circuit for normally connecting said clock source to said countdown chain, but said means being disabled by a change in the output state of said auxiliary bistable circuit, means under the joint control of said clock pulse source and the output of said auxiliary circuit for resetting said auxiliary circuit after said converting means has been disabled for a predetermined number of clock pulses, a plurality of coincidence gates, a switchhook status signaling lead from each of said trunk circuits, each of said leads being connected to a different one of said coincidence gates, means for combining the several outputs of said countdown chain on the respective coincidence gates in a logical manner so that the respective gates are enabled in a fixed sequence each counting cycle, a further bistable circuit driven by said countdown chain to change its state once every counting cycle, the output state of said further bistable circuit controlling a pair of said coincidence gates to provide a starting signal sequence of opposite polarity in successive counting cycles, and a common output point to which all coincidence gates are connected.

10. The communication system of claim 4 in which said first and second demultiplexing means comprise a local clock source operating at several times the frequency of the time-divided signal train, a chain of said binary countdown circuits each having direct and complementary outputs, means for recognizing a start signal sequence in the time-divided signal train, first bistable means controlled by said recognizing means for connecting said clock source to said countdown chain only after a start sequence, resetting means for said first bistable means operated when said countdown chain completes each counting cycle, a plurality of bistable register circuits having set and reset input points, a plurality of coincidence gates controlling the respective inputs of said register circuits, means for connecting the direct and complementary outputs of said countdown circuits in a predetermined logical order to said coincidence gates to enable the pairs of gates connected to individual registers in fixed sequential order each counting cycle, an input point for the time-divided signal train, gating means interconnecting said signal input point and the set and reset input points of said plurality of register circuits, the marking bits in said signal train being directed to said set inputs and the spacing bits, to said reset inputs, second bistable means operated by said recognition means when no start sequence is detected in said signal train to generate an inhibiting output for blocking all inputs to said register circuits, and means for connecting said last-mentioned inhibiting output to said gating means.

References Cited by the Examiner

UNITED STATES PATENTS

| | | | |
|---|---|---|---|
| Re. 25,546 | 3/1964 | Saol et al. | 179—15 |
| 2,624,806 | 1/1963 | Wright et al. | 179—155 |
| 3,226,484 | 12/1965 | James | 179—155 |

DAVID G. REDINBAUGH, *Primary Examiner.*

R. L. GRIFFIN, *Assistant Examiner.*